(12) United States Patent
Tsai et al.

(10) Patent No.: US 8,624,435 B2
(45) Date of Patent: Jan. 7, 2014

(54) POWER REGULATING APPARATUS

(76) Inventors: Tsao-Ching Tsai, Tainan (TW);
Shih-Wei Sun, Taipei (TW)

( * ) Notice: Subject to any disclaimer, the term of this patent is extended or adjusted under 35 U.S.C. 154(b) by 508 days.

(21) Appl. No.: 13/092,273

(22) Filed: Apr. 22, 2011

(65) Prior Publication Data

US 2012/0268973 A1    Oct. 25, 2012

(51) Int. Cl.
*H02J 7/00* (2006.01)
(52) U.S. Cl.
USPC .......................................................... 307/66
(58) Field of Classification Search
USPC ........................................................... 307/66
See application file for complete search history.

(56) References Cited

U.S. PATENT DOCUMENTS

2008/0290733 A1* 11/2008 Takahashi et al. .............. 307/66

* cited by examiner

*Primary Examiner* — Robert L. Deberadinis
(74) *Attorney, Agent, or Firm* — Shimokaji & Associates P.C.

(57) ABSTRACT

Disclosed is a power regulating apparatus, which is connected between an AC power and a load, for supplying the regulated AC power to the load. The power regulating apparatus includes a first regulating means provided to regulate the input AC power source when the AC power is at a normal power level, and a second regulating means provided to transmit an electric power to the load from a power storage means when the AC power is at a power level lower than the normal power level. Thus, the power regulating apparatus is capable of providing the load with an expected high quality electric power in all cases of AC power variation.

16 Claims, 4 Drawing Sheets

POWER REGULATING APPARATUS

FIELD OF THE INVENTION

The present invention relates to a power regulator, and more particularly to a power regulating apparatus.

BACKGROUND OF THE INVENTION

With the rapid development of technology, the electronic devices are required to provide with power accuracy. These advanced electronic devices widely applied in the technology industry thus rely on high quality electric power supplied to keep the devices in proper operation. On the other hand, the high quality electric power is also one of the key requirements to keep critical IT devices, which is now widely used in the world, in proper operation.

When the supplied electric power does not meet the specified requirement; the supplied electric power is unstable; or an inrush current has occurred, all these conditions will cause the malfunction of the electronic device. To the worst, it may cause damage of the electronic device or critical data lost in the electronic device. Therefore, there are widely aware of the field to improve the precision of the supplied voltage and/or current to the electronic device, to provide a stable electric power and to minimize the inrush current of the electric device to a power source.

In order to address the issues described above, currently, a protection apparatus can be provided between the electronic device and a power source supplied thereto so as to supply a suitable voltage and current to the electronic device after stabilization of the power source. However, since the conventional protection apparatus in the prior art has a very limited ability in regulating the electric power, many performance problems in power supply remain unresolved. It becomes obvious that many performance issues; at electronic device; prevent the delivery of adequate quality electric power.

SUMMARY OF THE INVENTION

In view of the above circumstances, the conventional protection apparatus in the prior art has limited ability in adjusting the electrical power so it is difficult to provide the electronic device with an expected high quality electric power.

Therefore, it is an object of the present invention to provide a power regulating apparatus for regulating an AC power and transmitting the regulated adequate electric power to an AC load or a DC load.

The present invention overcomes the drawbacks of the prior art, and provides a power regulating apparatus, which is connected between an AC power and a DC load, for regulating the AC power and transmitting the regulated AC power to the DC load. The power regulating apparatus comprises a first regulating means, provided with an input terminal connected with the AC power, regulating the AC power from an AC power source to a first output AC voltage and/or AC current; an AC-to-DC converting means, converting the first output AC voltage and/or AC current into a second output DC voltage and/or DC current, and providing an output terminal for transmitting the second output DC voltage and/or DC current to the DC load; a power storage means provided for storing or discharging an electric power; and a second regulating means provided with a charging terminal connected with the first regulating means, a discharging terminal connected with the output terminal of the AC-to-DC converting means, and a power access terminal connected with the power storage means.

In a preferred embodiment of the present invention, the DC load uses the second regulating means to monitor power condition of the AC power, and the second regulating means regulates the electric power transmitted from the power storage means to the DC load based on a load demand of the DC load In a preferred embodiment of the present invention, the first regulating means is an AC regulating circuit, and the second regulating means is a DC regulating circuit.

In a preferred embodiment of the present invention, the first regulating means regulates the input AC power to reduce inrush current to the AC power source.

In a preferred embodiment of the present invention, when the electrical power regulated by the first regulating means is at the normal power level, the second regulating means directs the electric power from the charging terminal to the power storage means to charge the power storage means In a preferred embodiment of the present invention, the power storage means is isolated by the second regulating means according to a safety management signal from a safety management unit.

In a preferred embodiment of the present invention, the electric power discharged from the power storage means is also activated by the second regulating means based on the communication with a power management unit. The power management unit also communicates with the first regulating means and other power requirements.

In a preferred embodiment of the present invention, the second regulating means sends a power status signal regarding the power storage means to the DC load.

Further, the present invention also provides a power regulating apparatus, which is connected between an AC power and an AC load, for regulating the AC power and transmitting the regulated AC power to the AC load. The power regulating apparatus comprises a first regulating means, provided with an input terminal connected with the AC power, regulating the AC power from an AC power source to a first output AC voltage and/or AC current; an AC power controlling means provided for transmitting the regulated power having the first output AC voltage and/or AC current or an AC electric power converted by a DC-to-AC converting means to the AC load; a power storage means provided for storing or discharging an electric power; and a second regulating means provided with a charging terminal connected with the first regulating means, a discharging terminal connected with an output terminal of the DC-to-AC converting means, and a power access terminal connected with the power storage means.

In a preferred embodiment of the present invention, the AC load uses the second regulating means to monitor power condition of the AC power, and the second regulating means regulates the electric power transmitted from the power storage means to the AC load depending on a load demand of the AC load.

In a preferred embodiment of the present invention, the first regulating means is an AC regulating circuit, and the second regulating means is a DC regulating circuit.

In a preferred embodiment of the present invention, the first regulating means regulates the input AC power to reduce an inrush current to the AC power source.

In a preferred embodiment of the present invention, when the electric power regulated by the first regulating means is at the normal power level, the second regulating means directs the electric power from the charging terminal to the power storage means to charge the power storage means In a preferred embodiment of the present invention, the power storage means is isolated by the second regulating means according to a safety management signal from a safety management unit.

In a preferred embodiment of the present invention, the electric power discharged from the power storage means is also activated by the second regulating means based on the communication with a power management unit. The power management unit also communicates with the first regulating means and other power requirements.

In a preferred embodiment of the present invention, the second regulating means sends a power status signal regarding the power storage means to the AC load.

Thereby, the power regulating apparatus according to the present invention is capable of providing the regulated AC power for the AC load or the DC load. In the case that the supplied electric power drops to a lower level or the supplied electric power is unstable, the second regulating means activates to connect the power storage means to load and regulates the stored electric power.

In some embodiments of the present invention, the power regulating apparatus has functions of power monitoring and load management. With these functions, it is capable of controlling the charge or discharge of the power storage means. It can monitor the health of power storage means. With the use of a smart load device, it can regulate the load demand based on the power status of the power storage means.

With all above, the regulated electric power by the power regulating apparatus provided in the present invention is capable of handling the specified requirements of accurate electric power for an advanced electronic device.

BRIEF DESCRIPTION OF THE DRAWINGS

The structure and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

Note that the terms "power" and "electric power" in this specification both mean an electric energy transferred by an electric circuit. Thus, in this specification, a power may be rephrased as an electric power and an electric power may be rephrased as a power unless otherwise specified.

Figure 1:
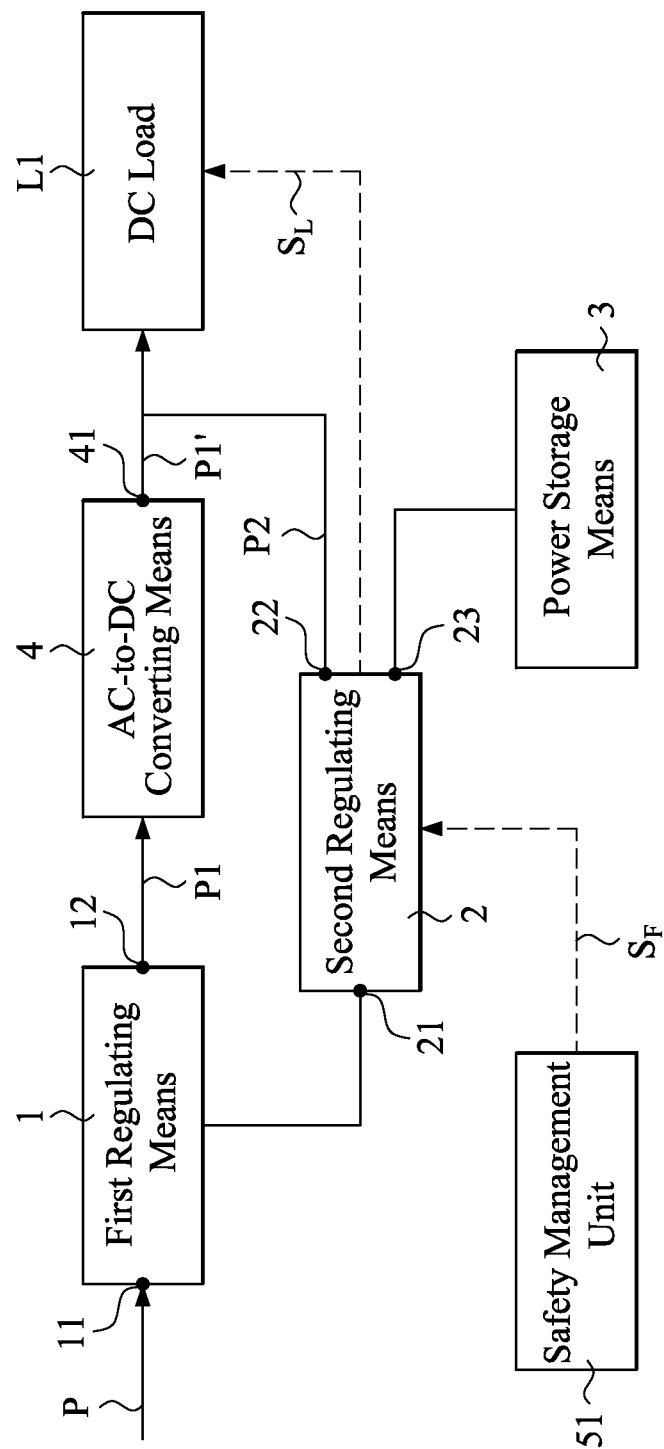
FIG. 1 is a block diagram of a first embodiment according to the present invention.

Please refer to FIG. 1. FIG. 1 is a block diagram of a first embodiment according to the present invention. As illustrated in FIG. 1, a power regulating apparatus of the first embodiment of the present invention is connected between an AC power P and a DC load L1 for regulating the AC power P and transmitting the regulated AC power to the DC load L1.

The AC power P input to the power regulating apparatus may be a single phase power such as a line-to-neutral single phase of a WYE voltage power or a lien-to-line single phase of a delta voltage power.

The DC load L1 may be an electric device such as a central processing unit, a network switching device, a data storage device, a math coprocessor, a PLC controller, a DDC controller, a DC-to-AC inverter, a digital signal processor, or the like.

The power regulating apparatus of the first embodiment of the present invention includes a first regulating means 1, a second regulating means 2, a power storage means 3, and an AC-to-DC converting means 4.

The first regulating means 1 is provided with an input terminal 11 connected with the AC power P. The first regulating means 1 is provided for regulating the AC power P from an AC power source (not shown) to a first output AC voltage and/or AC current (a power P1) and then outputting the regulated power P1 from an output terminal 12 thereof. The first regulating means 1 is capable of regulating the AC power P to reduce an inrush current of the AC power P. In this embodiment, the first regulating means 1 is an AC regulating circuit.

The second regulating means 2 is provided with a charging terminal 21, a discharging terminal 22, and a power access terminal 23. The charging terminal 21 is connected with the first regulating means 1, the discharging terminal is connected with an output terminal 41 of the AC-to-DC converting means 4, and the power access terminal 23 is connected with the power storage means 3. The second regulating means 2 regulates an electric power from the charging terminal 21 and directs the regulated electric power to the power storage means 3 so as to charge the power storage means 3. In this embodiment, the second regulating means 2 is a DC regulating circuit.

The power storage means 3 is provided for storing or discharging an electric power. As the power storage means 3, a battery such as a lead acid battery, a nickel metal hydride battery, a nickel cadmium battery, an alkaline battery, a lithium ion battery, and other type of batteries may be used. Other power storage devices besides various batteries can also be used.

The AC-to-DC converting means 4, which is connected with the output terminal 12 of the first regulating means 1, is provided for converting the first output AC voltage and/or AC current (the power P1) into a second output DC voltage and/or DC current (a power P1') and transmitting the power P1' from the output terminal 41 to the DC load L1.

With two regulating means (the first regulating means 1 and the second regulating means 2) described above, the power regulating apparatus is capable of providing the DC load L1 with an expected adequate quality electric power in all cases of power variation.

Specifically, when the AC power P is at a normal power level, the second regulating means 2 is operated in a standby mode. At the time, the AC power P is regulated by the first regulating means 1 and then the regulated power P1 output from the output terminal 12 of the first regulating means 1 is transmitted to the AC-to-DC converting means 4. By the AC-to-DC converting means 4, the regulated power P1 is converted into the power P1' having the second output DC voltage and/or DC current and is transmitted to the DC load L1. In additional, when the regulated power by the first regulating means 1 is at the normal power level, an electric power from the charge terminal 21 may be transmitted to and stored in the power storage means 3 by the second regulating means 2.

Note that the normal power level described in this specification is not limited to a constant value, and a variable value or a range for values may be used as the normal power level.

When the AC power P is at a lower power level than the normal power level (e.g., dropping of the supplied electric power or the supplied electric power is unstable), the second regulating means 2 is activated. At the time, the second regulating means 2 directs an electric power stored in the power storage means from the power access terminal 23 to the discharging terminal 22 and then transmits the electric power (a power P2) to the DC load L1 depending on a load demand of the DC load L1.

When the AC power P recovers to the normal power level, the second regulating means 2 isolates the connection between the power storage means 3 and the DC load L1 and then returns to operate in the standby mode.

Further, for consideration of safety, the power storage means 3 may be isolated from the second regulating means 2 according to a safety management signal $S_F$ from a safety management unit 51.

Moreover, if the DC load L1 is provided with an intelligent electronic means such as a processor, a controller, or the like, a power capacity status signal $S_L$ regarding the power storage means 3 may be sent from the second regulating means 2 to the DC load L1. Thus, the DC load L1 may perform the load management based on the power capacity status of the power storage means 3.

Figure 2:
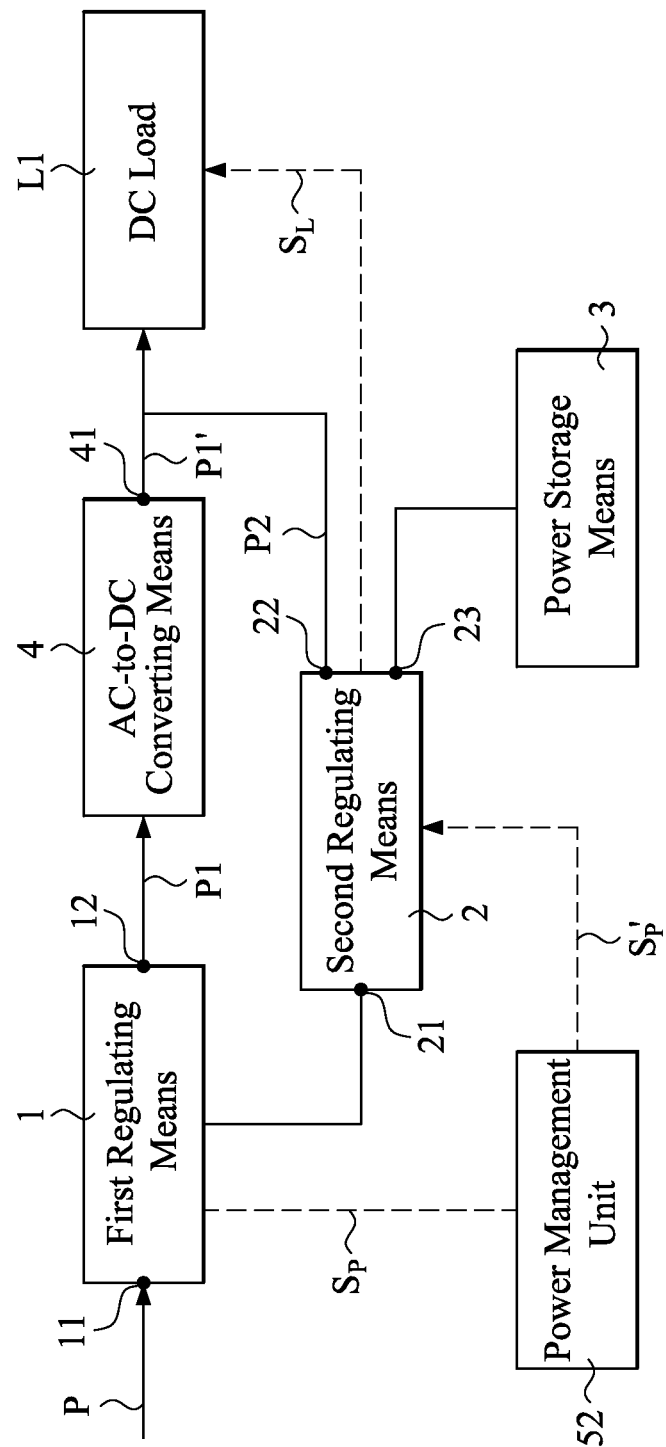
FIG. 2 is a block diagram of a second embodiment according to the present invention.

As illustrated in FIG. 2, the power regulating apparatus further includes a power management unit 52 in addition to the first regulating means 1, the second regulating means 2, the power storage means 3, and the AC-to-DC converting means 4.

The power management unit 52 is provided to receive a power status signal $S_P$ from the first regulating means 1 so as to generate a control signal $S_P'$ to the second regulating means 2 according to the received power status signal $S_P$ and other power requirements. Thus, the electric power discharged from the power storage means 3 is determined by the second regulating means 2 according to the control signal $S_P'$.

Figure 3:
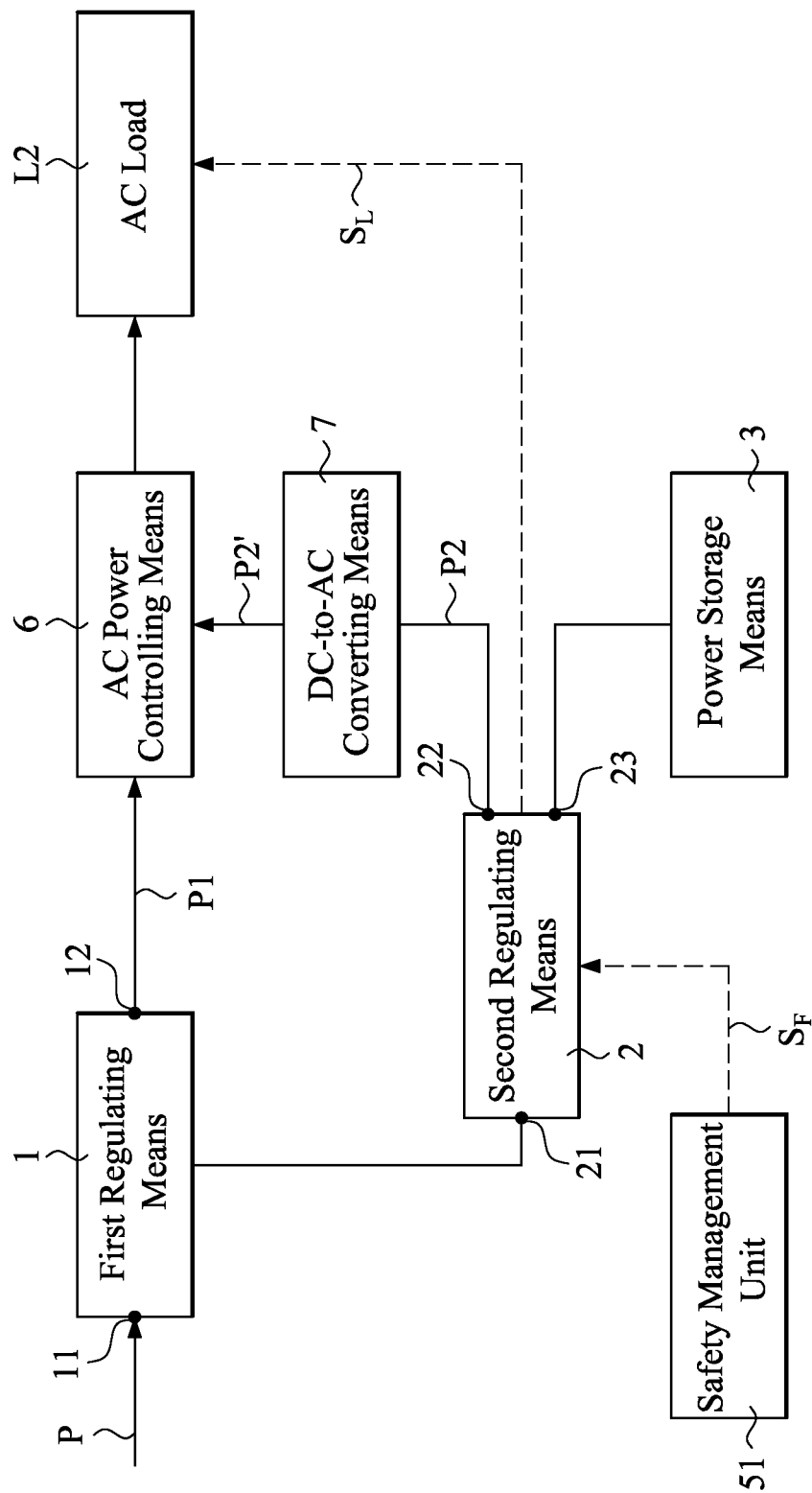
FIG. 3 is a block diagram of a third embodiment according to the present invention.

Please refer to FIG. 3. FIG. 3 is a block diagram of the third embodiment according to the present invention. The elements of a power regulating apparatus in the third embodiment of the present invention are similar to those in the first embodiment. For this reason, the same elements in the third embodiment are labeled with the same reference numbers as in the first embodiment.

As illustrated in FIG. 3, the power regulating apparatus of the third embodiment of the present invention is connected between an AC power P and an AC load L2 for regulating the AC power P and transmitting the regulated AC power to the AC load L2.

The AC power P input to the power regulating apparatus of this embodiment, which is similar to that of the embodiment described above, may be a single phase power such as a line-to-neutral single phase of a WYE voltage power or a lien-to-line single phase of a delta voltage power.

The AC load L2 may be an electric device such as a speed control fan motor, a speed controlled pump motor, or the like.

The power regulating apparatus of the third embodiment of the present invention includes a first regulating means 1, a second regulating means 2, a power storage mean 3, an AC power controlling means 6, and a DC-to-AC converting means 7.

The first regulating means 1 of the third embodiment is similar to the first embodiment, and the first regulating means 1 is provided with a input terminal 11 connected with the AC power P for regulating the AC power P to a first output AC voltage and/or AC current. The first regulating means 1 is capable of regulating the AC power P to reduce an inrush current of the AC power P. The second regulating means 2 is provided with a charging terminal 21 connected with the first regulating means 1 and a power access terminal 23 connected with the power storage means 3. The second regulating means 2 regulates an electric power received from the charging terminal 21 and directs the regulated electric power to the power storage means 3 so as to charge the power storage means 3. A different of the second regulating means 2 of the third embodiment to that of the first embodiment is that a discharging terminal 22 of the second regulating means 2 is connected with the DC-to-AC converting means 7.

The AC power controlling means 6 is provided for transmitting the AC power P1 output from the first regulating means 1 or an AC electric power P2' converted by a DC-to-AC converting means 7 to the AC load L2.

The DC-to-AC converting means 7 is provided for converting a DC voltage and/or DC current (a power P2) input from the discharging terminal 22 into an electric power P2' with AC voltage and/or AC current, and directs the electric power P2' to the AC power controlling means 6.

When the AC power P is at a normal power level, the second regulating means 2 is operated in a standby mode. At the time, the AC power P is regulated by the first regulating means 1 and then the regulated power P1 output from the output terminal 12 of the first regulating means 1 is transmitted to the AC-to-DC converting means 4. By the AC-to-DC converting means 4, the regulated power P1 is converted into the power P1' having the second output DC voltage and/or DC current, and the power P1' is transmitted to the DC load L1. In additional, when the regulated power by the first regulating means 1 is at the normal power level, an electric power output from the charge terminal 21 may be transmitted to and stored in the power storage means 3 via the second regulating means 2.

When the AC power P is at a power level lower than the normal power level, the second regulating means 2 is activated. At the time, the second regulating means 2 directs an electric power stored in the power storage means 3 to the DC-to-AC converting means 7 and then transmits the converted electric power through the AC power controlling means 6 to the AC load L2 based on a load requirement of the AC load L2. Thus, it keeps the AC load L2 to obtain a stable and normal electric power level.

When the AC power P recovers to the normal power level, the second regulating means 2 returns to operate in the standby mode in which the connection between the power storage means 3 and the DC-to-AC converting means 7 is isolated.

Further, for consideration of safety, the power storage means 3 may be isolated from the second regulating means 2 according to a safety management signal $S_F$ from a safety management unit 51.

Moreover, if the AC load L2 is provided with an intelligent electronic means such as a processor, a controller, or the like, a power capacity status signal $S_L$ regarding the power storage means 3 may be sent from the second regulating means 2 to the AC load L2. Thus, the AC load L2 may perform the load management based on the power capacity status of the power storage means 3.

Figure 4:
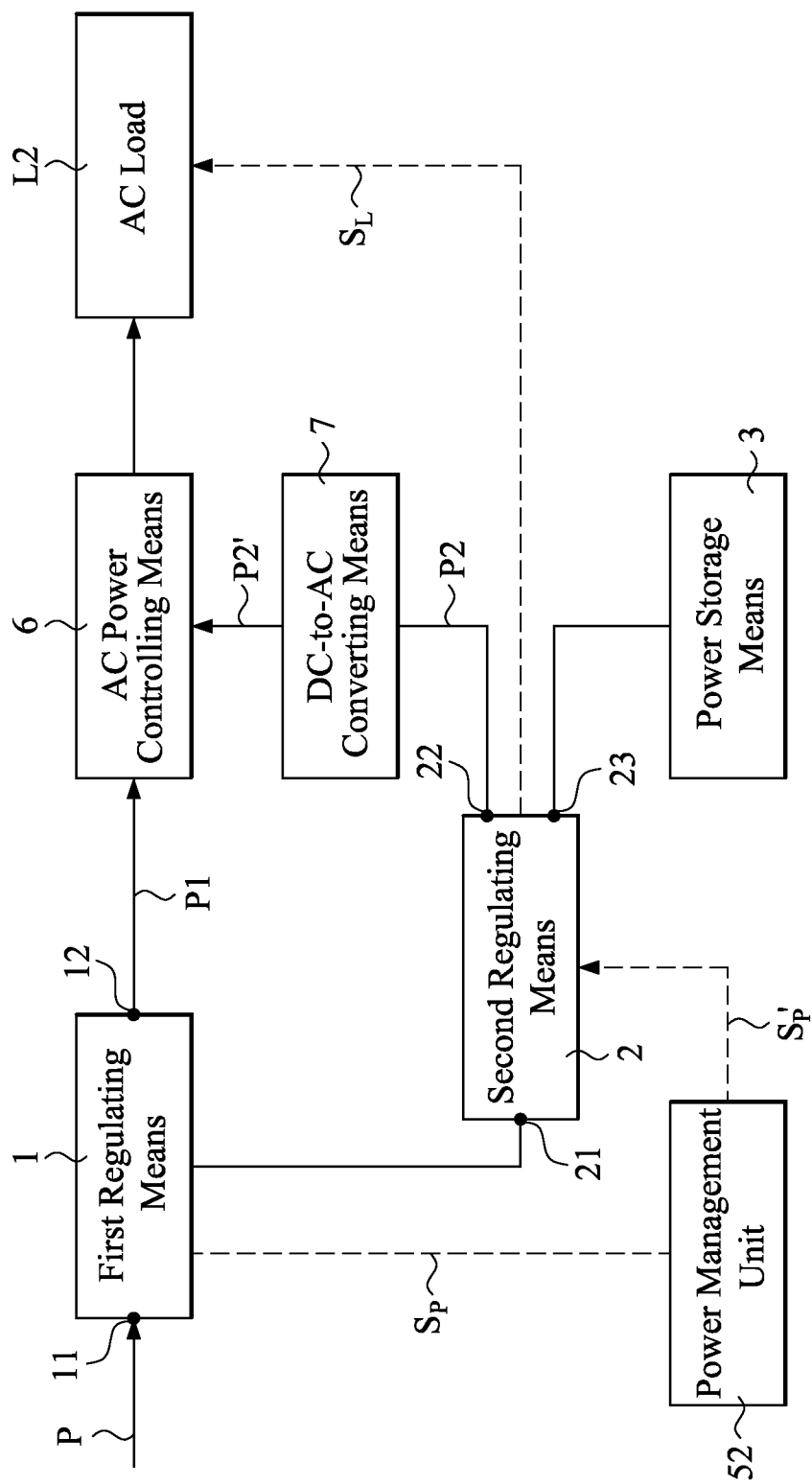
FIG. 4 is a block diagram of a fourth embodiment according to the present invention.

As illustrated in FIG. 4, the power regulating apparatus further includes a power management unit 52 in addition to the first regulating means 1, the second regulating means 2, the power storage means 3, the AC power controlling means 6, and the DC-to-AC converting means 7.

The power management unit 52 of this embodiment, similar to that of the second embodiment, is provided to receive a power status signal $S_P$ from the first regulating means 1 so as to generate a control signal $S_P'$ to the second regulating means 2 according to the received power status signal $S_P$ and other power requirements. Thus, the electric power discharged from the power storage means 3 is determined by the second regulating means 2 according to the control signal $S_P'$.

By the embodiments described above, the regulated power by the power regulating apparatus provided in the present invention meets the specified requirement of a high quality electric power for an advanced electronic device. Further, the elements such as the regulating means, the converting means, the power controlling means, the power management unit, and the like in the above described embodiments may be each an individual unit or may be an integrated unit having the functions of these elements as appropriate. Moreover, it is also understood that all the elements can be arranged in different configurations to achieve best overall performance for the ever changing device power quality requirements.

As can be appreciated from the above embodiments, the power regulating apparatus of the present invention has industry worth which meets the requirement for a patent. The above description should be considered as only the discussion of the preferred embodiments of the present invention. However, a person having ordinary skill in the art may make various modifications to the present invention. Those modifications still fall within the spirit and scope defined by the appended claims.

What is claimed is:

1. A power regulating apparatus, which is connected between an AC power and a DC load, for regulating the AC power and transmitting the regulated AC power to the DC load, the power regulating apparatus comprising:
   a first regulating means, provided with an input terminal connected with the AC power, regulating the AC power from an AC power source to a first output AC voltage and/or AC current;
   an AC-to-DC converting means, converting the first output AC voltage and/or AC current into a second output DC voltage and/or DC current, and providing an output terminal for transmitting the second output DC voltage and/or DC current to the DC load;
   a power storage means provided for storing or discharging an electric power; and
   a second regulating means provided with a charging terminal connected with the first regulating means, a discharging terminal connected with the output terminal of the AC-to-DC converting means, and a power access terminal connected with the power storage means,
   wherein the second regulating means regulates an electric power received from the charging terminal and directs the regulated electric power to the power storage means so as to charge the power storage means,
   wherein the second regulating means directs an electric power stored in the power storage means to the DC load via the discharging terminal when the AC power is at a power level lower than a normal power level,
   wherein the second regulating means isolates the connection between the power storage means and the DC load when the AC power recovers to the normal power level.

2. The power regulating apparatus as claimed in claim 1, wherein the DC load uses the second regulating means to monitor power condition of the AC power, and the second regulating means regulates the electric power transmitted from the power storage means to the DC load based on a load demand of the DC load.

3. The power regulating apparatus as claimed in claim 1, wherein the first regulating means is an AC regulating circuit, and the second regulating means is a DC regulating circuit.

4. The power regulating apparatus as claimed in claim 1, wherein the first regulating means regulates the input AC power to reduce inrush current to the AC power source.

5. The power regulating apparatus as claimed in claim 1, wherein the second regulating means directs the electric power from the charging terminal to the power storage means to charge the power storage means when the electric power regulated by the first regulating means is at the normal power level.

6. The power regulating apparatus as claimed in claim 1, wherein the power storage means is isolated by the second regulating means according to a safety management signal from a safety management unit.

7. The power regulating apparatus as claimed in claim 1, wherein the electric power discharged from the power storage means is activated by the second regulating means based on the communication with a power management unit, and the power management unit communicates with the first regulating means and other power requirements.

8. The power regulating apparatus as claimed in claim 1, wherein the second regulating means sends a power status signal regarding the power storage means to the DC load.

9. A power regulating apparatus, which is connected between an AC power and an AC load, for regulating the AC power and transmitting the regulated AC power to the AC load, the power regulating apparatus comprising:
   a first regulating means, provided with an input terminal connected with the AC power, regulating the AC power from an AC power source to a first output AC voltage and/or AC current;
   an AC power controlling means provided for transmitting the regulated power having the first output AC voltage and/or AC current or an AC electric power converted by a DC-to-AC converting means to the AC load;
   a power storage means provided for storing or discharging an electric power; and
   a second regulating means provided with a charging terminal connected with the first regulating means, a discharging terminal connected with an output terminal of the DC-to-AC converting means, and a power access terminal connected with the power storage means,
   wherein the DC-to-AC converting means converts a DC voltage and/or a DC current into the electric power having AC voltage and/or AC current, and directs the AC electric power to the AC power controlling means,
   wherein the second regulating means regulates an electric power received from the charging terminal and directs the regulated electric power to the power storage means so as to charge the power storage means,
   wherein the second regulating means directs an electric power stored in the power storage means to the AC load via the DC-to-AC converting means when the AC power is at a power level lower than a normal power level,
   wherein the second regulating means isolates the connection between the power storage means and the DC-to-AC converting means when the AC power recovers to the normal power level.

10. The power regulating apparatus as claimed in claim 9, wherein the AC load uses the second regulating means to monitor power condition of the AC power, and the second regulating means regulates the electric power transmitted from the power storage means to the AC load depending on a load demand of the AC load.

11. The power regulating apparatus as claimed in claim 9, wherein the first regulating means is an AC regulating circuit, and the second regulating means is a DC regulating circuit.

12. The power regulating apparatus as claimed in claim 9, wherein the first regulating means regulates the input AC power to reduce an inrush current to the AC power source.

13. The power regulating apparatus as claimed in claim 9, wherein the second regulating means directs the electric power from the charging terminal to the power storage means to charge the power storage means when the electric power regulated by the first regulating means is at the normal power level.

14. The power regulating apparatus as claimed in claim 9, wherein the power storage means is isolated by the second regulating means according to a safety management signal from a safety management unit.

15. The power regulating apparatus as claimed in claim 9, wherein the electric power discharged from the power storage means is activated by the second regulating means based on the communication with a power management unit, and the power management unit comminutes with the first regulating means and other power requirements.

16. The power regulating apparatus as claimed in claim 9, wherein the second regulating means sends a power status signal regarding the power storage means to the AC load.

\* \* \* \* \*